United States Patent Office 2,696,830
Patented Dec. 14, 1954

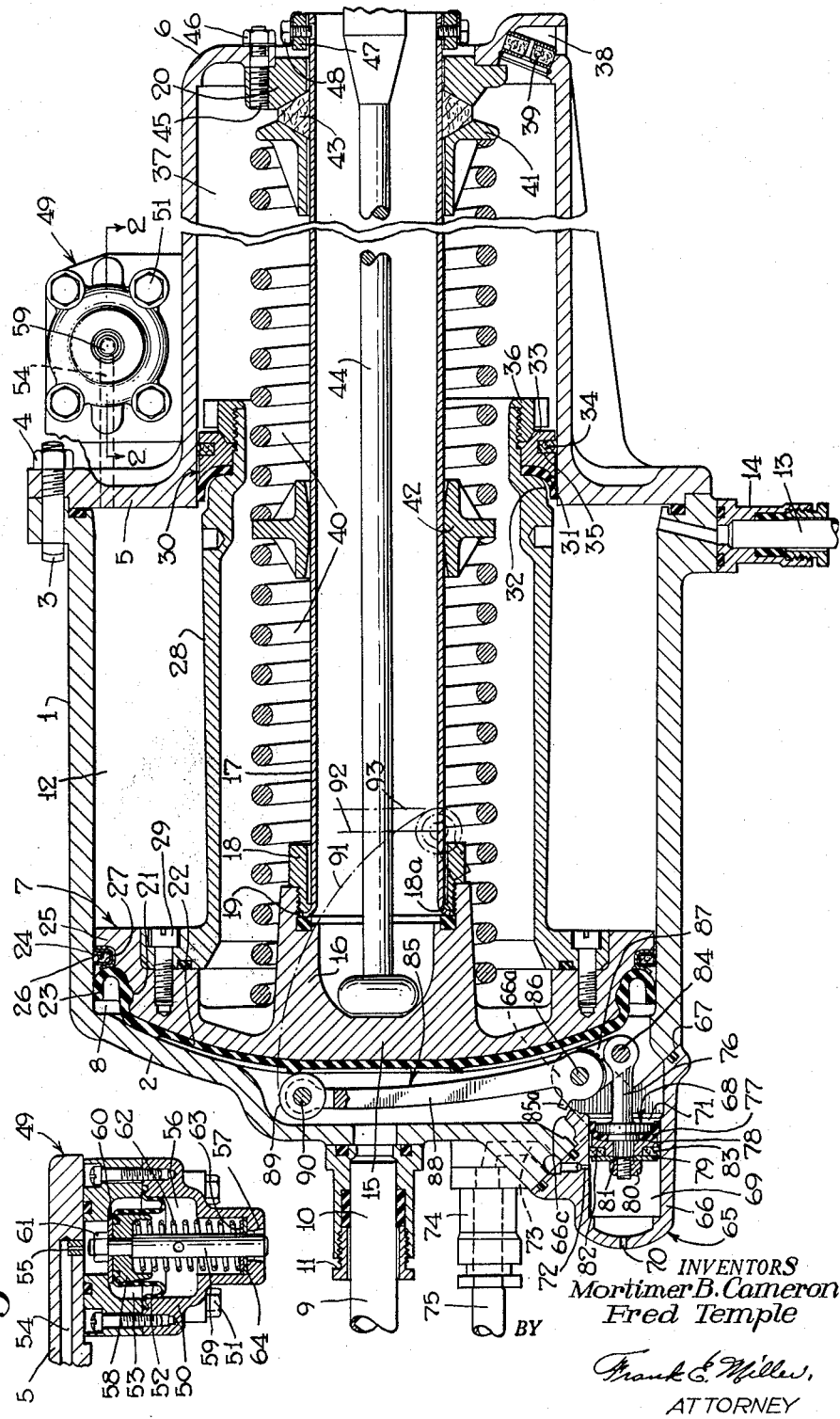

2,696,830

BRAKE CYLINDER DEVICE

Mortimer B. Cameron, Edgewood, and Fred Temple, Pittsburgh, Pa., assignors to Westinghouse Air Brake Company, a corporation of Pennsylvania Application January 28, 1950, Serial No. 141,092

6 Claims. (Cl. 137—494)

This invention relates to fluid pressure brake cylinder devices and more particularly to brake cylinder devices adapted for use in variable load brake equipment of the type shown and described in Patent No. 2,482,246, issued to Earle S. Cooke et al. on September 20, 1949, and assigned to the assignee of the present invention.

In the aforementioned patent there is disclosed and described an improved variable load brake equipment, which is adapted to automatically vary the degree of braking of a vehicle in accordance with the degree of load carried thereby. The improved equipment comprises a brake cylinder device embodying a piston adapted to be operatively connected to the usual brake rigging arranged to be actuated for applying force to the brake shoe or shoes by action of pressure of fluid in the usual pressure chamber at the one side of said piston as controlled by the well-known AB valve, fully described in the patent to Clyde C. Farmer, No. 2,031,213, issued February 18, 1936, against the action of the opposing pressure of fluid in a compensating chamber at its opposite side, which latter pressure is varied upon supply of fluid under pressure to said usual chamber in inverse proportion to the degree of load by a relay valve device which is sensitive to changes in load. Upon release of fluid under presssure from the usual pressure chamber the piston is arranged to be returned to its brake release position by its usual release spring.

One object of the invention is to provide an improved fluid pressure brake cylinder device of the above described type.

Another object of the invention is to provide in a brake cylinder device of the above type novel means for defining the compensating pressure chamber, which means permits removal of the non-pressure head for servicing or the like, without freeing the precompressed release spring.

Another object is to provide a brake cylinder device of the above type in which it is unnecessary to break any pipe connections to service the device.

Still another object of the invention is to provide an improved brake cylinder device embodying improved and novel means for controlling a slack adjuster, which means may be detached or removed from the device as a unit for any purpose such as servicing.

Other objects and advantages will be apparent from the following more detailed description of the invention.

In the accompanying drawing, Fig. 1 is a diagrammatic view, chiefly in section, taken longitudinally through a brake cylinder device embodying the invention, and Fig. 2 is a sectional view of a portion of said brake cylinder device taken along the line 2—2 of Fig. 1.

As shown in Fig. 1 on the drawing, the improved brake cylinder device comprises a hollow cylindrical casing 1 which may be a casting of iron or other suitable metal, and which is closed at one end by a pressure head 2 cast integral therewith. To the open end of the casing 1 is secured by any suitable means such as T-headed bolts 3 and nuts 4, an annular pressure head 5 having a central portion extending outwardly and terminating in a cup-shaped nonpressure head 6. A brake cylinder piston assemblage 7 is slidably mounted in the casing 1, and at one side thereof is the usual or main pressure chamber 8 which is connected to a brake cylinder pipe 9 by way of passage 10 extending through a removable fitting 11 and centrally through the pressure head 2. The pipe 9 is adapted to be connected to a fluid pressure control valve device (not shown), such as the AB valve shown and described in the aforesaid Farmer Patent No. 2,031,- 213, to effect variations in pressure of fluid in the pressure chamber 8 for controlling and operating piston assemblage 7.

At the other side of the piston assemblage 7 is a load compensating pressure chamber 12 defined in part by the pressure head 5, the casing 1 and said piston assemblage 7. The chamber 12 is open to a passage 13 in a removable fitting 14 which is adapted to be connected to a compensating supply valve means such as that described in the aforementioned patent for varying the degree of braking power in the manner described in said patent.

The piston assemblage 7 comprises an annular piston head 15 which also may be of cast iron, which head is provided at its inner face with a central annular collar 16 to which is secured one end of a hollow piston rod 17 by means of a nut 18 secured in said collar and engaging a flared end 18a of the rod. Interposed between the nut 18 and collar 17 on the piston head 15 is a circular ring 19 formed of rubber or other suitable resilient material to provide a limited degree of angular movement of the piston rod 17 relative to the collar and thereby eliminate or prevent possible binding of the piston rod against the bearing surface of a bearing 20 mounted in the non-pressure head 6, which binding might arise from misalignment between said rod and said bearing. The piston head is further provided on its outer periphery with an annular groove 21 for accommodating a resilient snap-on packing cup 22 disposed in the main pressure head 8.

The packing cup 22 is provided with an annular U-shaped portion 23, which portion is open to chamber 8 and which curves into slidable contact with the inner wall of the casing 1 in such a manner that pressure of fluid in said chamber acts thereon to urge it into sealing engagement with said wall for preventing leakage of fluid under pressure past the piston head. An annular substantially U-shaped metal ring 24 is interposed between the portion 23 of the packing cup 22 and one face of an annular flange 25 projecting radially outward from the piston head 15. A portion of the ring 24 is curved to form a support for the back of portion 23 of cup 22. A lubricating swab 26 in the form of a felt cylinder ring encased in an expanding ring 27, is disposed within the ring 24 and thereby secured to move with the piston head 16 in slidable contact with the casing wall to store and distribute lubricant thereon for a considerable period of time. The outer peripheral edge of the flange 25 attached to the piston head 15 is formed so as to provide an accurate fit for slidable contact between said head and the casing wall.

A hollow cylindrical member 28, which takes part in defining the compensating chamber 12, is secured at its inner end to the inner face of the piston head 15 by means of slotted head screw bolts 29 and at its outer end is slidably guided in the non-pressure head 6 by means of an annular packing cup assemblage 30, which assemblage makes slidable sealing engagement with the inner wall of the nonpressure head 6.

The piston assemblage 30 comprises a packing cup 31 which is held against a rounded shoulder 32 on the member 28 adjacent its outer end by a follower 33 so as to turn the packing cup 31 inwardly toward the compensating chamber 12 and into engagement with the inner wall of the nonpressure head 6. The follower 33 has an annular lubricating swab 34 mounted in a groove 35 in the periphery of said follower and is held against the packing cup 31 by a locking nut 36 which makes a screw-threaded connection with the outer end of cylindrical member 28.

Interiorly of the cylindrical member 28 and non-pressure head 6 and encircling the piston rod 17 is an annular chamber 37 closed at its inner end by a portion of the piston head 15 and at its outer end by the end wall of the non-pressure head 6. This chamber 37 is open to atmosphere by way of a passage 38 provided in non-pressure head 6 and in which is interposed a strainer 39.

Contained in the chamber 37 is a two-part return spring 40 abutting the inner surface of the piston head at one end and a spring seat 41 at the other end, and supported between the adjacent ends of the two parts of said spring by a spring support member 42 for the purpose of preventing the spring from beating, scoring and rubbing the piston rod 17 and thereby wearing grooves in same. The member 42 is slidably supported on the piston rod 17. The outer face of the spring seat 41 which encircles the piston rod 17 is chamfered for the accommodation of a felt filtering ring 43 which is compressed between the spring seat 41 and a similarly but oppositely chamfered face at the inner side of the bearing 20 so that the ring which was initially rectangular in cross section is compressed into a beveled cross section and squeezed radially inward against the outer surface of the piston rod 17.

A push rod 44, which is linked to a brake rigging (not shown), projects into the hollow rod 17 and abuts the inner face of the piston head 15 for transmitting the force exerted by the piston assemblage 7 to the brake rigging for applying the brakes (not shown). The bearing 20 is secured to the non-pressure head 6 by means of a plurality of studs 45 and nuts 46. A retaining ring 47 in the usual form is secured by means of a plurality of headed bolts 48 to the outer end of the hollow piston rod 17. This arrangement makes it possible to remove the non-pressure head 6 from the casing 1 for servicing the brake cylinder device, while keeping the return spring 40 compressed by the retaining ring 47, as will be explained in detail later.

The brake cylinder device is provided with a pressure indicator 49 which indicates at all times whether or not there is fluid under pressure present in the load compensating pressure chamber 12 for thereby enabling an inspector of the brake equipment to determine visually at any time the brakes are applied whether or not the brake equipment is adjusted for an empty or loaded car.

The pressure indicator 49 comprises a hollow cylindrical casing 50 mounted to the casing 1 by headed bolts 51 and having clamped at its periphery between two parts of said casing a flexible diaphragm 52. At one side of the diaphragm 52 is a chamber 53 which is connected to the load compensating chamber 12 by a passage 54 formed in the pressure head 5. A choke 55 is provided in passage 54 for the purpose of preventing undue loss of fluid under pressure from the compensating pressure chamber 12, in the event of a ruptured diaphragm 52, to a chamber 56 at the other side of diaphragm 52 and thence to atmosphere by way of an opening 57. Contained in the chamber 56 is a diaphragm follower 58, which is clamped to the inner periphery of the diaphragm 52 by means of a stem 59 a reduced end of which extends through said follower and diaphragm and a washer 60 into chamber 53 there to make screw-threaded engagement with a nut 61. Also contained in chamber 56 is a spring 62 encircling the stem 59 and operatively engaging the follower 58 and a spring seat washer 63 so as to maintain said stem in a position for either full load or brake release indication, as the case may be, shown in Fig. 2 of the drawings. The washer 63 also serves as a guide for the stem 59 and as a compression member for a filtering element 64 which encircles the stem and is interposed between said washer and an end wall in the casing 50 so that air passing from the atmosphere to the chamber 56 must pass through said filter.

There is also provided in this brake cylinder device a piston travel measuring mechanism 65 for controlling the operation of a slack adjuster, which takes up slack in the brake rigging so that the brakes are applied with the desired degree of force. The measuring mechanism 65 comprises a casing 66 secured by any suitable means (not shown) on a mounting face 67 on the pressure head 2 having slidably mounted therein a piston assemblage 68. At one side of the piston assemblage 68 is a chamber 69 which is always open to atmosphere through an atmospheric port 70, while at the other side of said piston assemblage is a chamber 71 which is always open to the main pressure chamber 8. In the cylindrical wall of the casing 66 is a port 72 which is adapted to be connected to a slack adjuster (not shown) by way of connected passages 73 in casings 66 and 2 and a removable fitting 74 (similar in construction to fitting 11) and a pipe 75. The port 72 normally is open to atmospheric chamber 69 but adapted to be connected to the main pressure chamber 8 by way of chamber 71 when an application of brakes is effected if there is too much slack in the rigging and, as a result, the piston assemblage 68 overtravels, as will appear more fully later.

The piston assemblage 68 comprises a follower and stem 76 on which is mounted a packing cup 77 having its periphery turned inwardly toward the main pressure chamber 8. The cup 77 is held in abutting engagement with the follower 76 by means of a piston head 78 formed to coincide with the outer contour of packing cup 77, which head is in turn abutted by a washer 79. The outer end of follower and stem 76 extends through central openings in the cup 77, piston head 78 and washer 79, respectively, into screw-threaded engagement with a nut 80 within the chamber 69.

The nut 80 holds the washer 79 in abutting engagement with an annular shoulder 81 on the piston head 78 so as to form an annular groove 82 in which a lubricating swab 83 formed of felt or similar material is carried in sliding engagement with the cylindrical wall engaged by cup 77 for the purpose of storing and depositing lubricant on said wall.

The opposite end of the stem 76 extends into the main pressure chamber 8 and there makes, by means of a pin 84, a pivotal connection with a lever 85 rockably mounted on a pin 86 secured between two ears 66a formed integral with the casing. The lever 85 comprises a relatively short arm 87 at one side of the pin 86 which is bifurcated for the accommodation of the stem 76 and a longer arm 88 at the opposite side of pin 86 which arm is also bifurcated at its outer end for the accommodation of a roller 89 carried on a pin mounted in arm 88. The roller 89 is adapted to engage the packing cup 22 and to travel therewith as the cup moves to effect an application of the brakes, as will hereinafter more fully appear.

For reasons which will appear later the lever 85 is further provided with a lug 85a which may engage a stop 66c interposed between the ears 66a and formed integral therewith.

In operation in conjunction with the variable load brake equipment shown and described in the aforementioned Patent No. 2,482,246, when the equipment operates to effect an application of the brakes, fluid under pressure is supplied to the main pressure chamber 8 and when the pressure of such fluid acting on piston assemblage 7 in chamber 8 is sufficient to overcome the force of the spring 40, the piston assemblage will move to the right, as viewed in Fig. 1 of the drawing, and through the medium of the push rod 44 and associated brake rigging (not shown) move the brake shoes (not shown) into frictional engagement with the wheels (not shown) of the vehicle.

At the same time, fluid under pressure supplied to chamber 8 is communicated therefrom to chamber 71 in the measuring mechanism 65 and acts on piston assemblage 68 to urge it toward the left hand as viewed in the drawing.

Thus, as the piston assemblage 7 moves outward against the force of the spring 40 to effect an application of the brakes it permits the piston assemblage 68 to move to the left and rock the lever 85 in a clockwise direction about the pin 86 carrying the roller 89 in an arc indicated by the broken line 91, thereby holding the roller 89 in abutting engagement with the packing cup 22. If the travel of the piston assemblage 7 is excessive due to wear of the brake shoes or rigging, the roller 89 will assume a position indicated at the broken line 93 and piston assemblage 68 will be permitted to pass the mouth of the port 72, thereby connecting chamber 71 to port 72. Fluid under pressure supplied to chamber 8 will then flow to a slack adjuster (not shown) by way of chamber 71, port 72, passage 73, through fitting 74 and pipe 75 and will operate the slack adjuster to pick up the aforesaid excessive slack.

Now, if the vehicle is less than fully loaded, the aforementioned variable load brake equipment will operate to supply fluid to the brake cylinder pressure chamber 12 at a degree of pressure inversely proportional to the weight of the load carried by the vehicle. Fluid under pressure supplied to the brake cylinder pressure chamber 12 will flow to pressure indicator through passage 54 and choke 55 to the chamber 53 where it will act upon the diaphragm 52. When the fluid pressure in chamber 53 is sufficient to overcome the force of the spring 62, the diaphragm 52 will deflect downward as viewed in Fig. 2 and project the attached stem 59 into the view of an outside observer, thus making it possible to determine at a glance whether fluid under pressure is present in the brake cylinder pressure chamber 12.

When it is desired to inspect and lubricate the brake cylinder device the push rod 44 will be removed first in the usual manner by disconnecting it from the brake rigging. The pressure head 5 may then be removed by first freeing the non-pressure head 6 formed integral therewith from the bearing 20 by removing the nuts 46 from the studs 45. Following this, the nuts 4 may be loosened on the bolts 3 and as they are loosened the head 5 will move outwardly under the influence of spring 40 acting through the medium of the spring seat 41, ring 43 and bearing 20 until said bearing engages the retaining ring 47. With the bearing 20 in engagement with the ring 47 further expansion of the spring 40 is prevented. As a result the nuts 4 may then be removed from the bolts 3 and the pressure head 5 then removed by sliding it away from engagement with the packing cup assemblage 30.

The piston assemblage 7 and the piston rod 17 and hollow cylindrical member 28 attached thereto may then be removed in the usual manner. However, there will be this difference, that the return spring 40 will be included in the assemblage and will therefore stay compressed, which obviously is a great advantage also.

It will be noted that, since the fittings 10 and 74 are connected directly to casing 2, it is not necessary to break any pipe connections to disassemble the device. Also, the pressure indicator 50 will be carried with the pressure head 5 and may be removed as a unit and disassembled when desired without disturbing anything else since the passage 54 connects chamber 53 directly to the chamber 12 when mounted on pressure head 5.

The piston travel measuring mechanism 65 may likewise be removed as a unit without disturbing any pipe connections because the pipe connection is made to the casing 2 in which there is the passage 74 connecting pipe 75 to chamber 66 in the mechanism. It will be noted that the mounting face 67 is disposed at a bias or at an angle from the horizontal so that when the casing 66 is loosened in the usual manner, the lever 85 which is mounted on the casing may be drawn down through the opening in the face. Yet, when the mechanism is normally mounted, the bottom thereof is substantially in line with the bottom of the brake cylinder device.

If the mechanism 65 were positioned so that the lever 85 would have a tendency to rotate in a counter-clockwise direction as viewed in the drawing, this action might pull the piston assemblage 68 out of the casing 66. This action will be prevented, however, by the engagement of the lug 85a on the lever 85 with the stop 66c on the casing 66 prior to the emergence of the piston assemblage from the casing. Thus, it will readily be seen that the mechanism 65 will stay together as an operating unit by reason of the above mentioned lug and stop.

If it is desired to inspect and lubricate the mechanism 65 the pin 86 may be removed from the casing 66, in the usual manner and the lever 85 used as a handle to withdraw the piston assemblage from the casing 66.

*Summary*

From the foregoing it will be seen that there has been provided an improved brake cylinder device of the type having two chambers for receiving opposing fluid pressures, which device may be very easily disassembled in units without breaking any pipe connections, the non-pressure head and piston being readily removable by reason of retaining the release spring compressed in a unique and improved manner. The brake cylinder device also embodies improved means for controlling operation of a slack adjuster device and thereby the brake applying stroke of the brake cylinder pistons.

Having now described the invention, what we claim as new and desire to secure by Letters Patent, is:

1. A brake cylinder device comprising a casing, a first piston slidably mounted in said casing and having a piston stem, a pressure chamber at one side of said first piston, a conduit through which fluid under pressure may be supplied to said pressure chamber to actuate said piston to a certain position, a control conduit through which fluid under pressure may flow from said pressure chamber, a lever rockably mounted intermediate its ends in said pressure chamber, a second piston slidably mounted in said casing and operatively connected to one end of said lever, said second piston being responsive to pressure of fluid in said pressure chamber to hold the other end of said lever in abutting engagement with said first piston and being effective upon travel of said first piston by fluid under pressure beyond a predetermined zone to connect said pressure chamber to said control conduit.

2. A brake cylinder device comprising a casing, a brake cylinder piston slidably mounted in said casing, a pressure chamber at one side of said piston, a conduit through which fluid under pressure may be supplied to said pressure chamber to actuate said piston to its normal position, a control conduit, a lever disposed in said pressure chamber and rockably mounted intermediate its ends on a section of said casing, a second piston slidably mounted in said section and operatively connected to one end of said lever responsive to pressure of fluid in said pressure chamber to move inwardly in said section, thereby holding the other end of said lever in engagement with said brake cylinder piston and rocking said lever in one direction as said brake cylinder piston moves toward its applied position, a lug on said lever for engagement with said section to limit the rocking of said lever in a direction opposite to said one direction and thereby limit outward movement of said second piston when said section is removed from the rest of the casing, and valve means associated with said second piston for connecting said pressure chamber to said other conduit when said brake cylinder piston travels beyond said normal position.

3. A brake cylinder device comprising a casing, a brake cylinder piston slidably mounted in said casing, a pressure chamber at one side of said piston, and a brake cylinder piston travel measuring mechanism comprising a section of said casing having a bore therein open to said pressure chamber and a control port at a certain position longitudinally in the wall of said bore, a second piston slidably mounted in said bore, a lever rockably mounted intermediate its ends on a portion of said casing section operatively connected at one end to said second piston and movable in one direction to determine the position of said second piston in said bore according to position of said brake cylinder piston and movable in the opposite direction to actuate said second piston outwardly relative to said bore, and stop means associated with said lever and said section for limiting the movement of said lever in said opposite direction so as to prevent the emergence of said second piston from said bore when said section is detached from the rest of said casing.

4. A brake cylinder device comprising a cylinder closed at one end by a pressure head, a brake cylinder piston slidably mounted in said cylinder and cooperative with said head to form a pressure chamber, a pipe connected to said head providing for supply of fluid under pressure to said chamber for moving said piston, said pressure head having an opening facing in the general direction of the axis of said piston, a casing section removably secured to said pressure head over said opening and having a piston bore, a control piston slidably mounted in said bore subject on one side to pressure of fluid in said chamber, a passageway in said casing section opening the opposite side of said control piston to atmosphere, a lever fulcrumed intermediate its ends on said casing section having one arm disposed between said piston and head, bearing means at the end of said arm engaging said brake cylinder piston adjacent its axis, means connecting the other arm of said lever to said control piston rendering pressure of fluid in said chamber acting on said control piston effective to hold said bearing means in contact with said brake cylinder piston, a control pipe connected to said pressure head, and registering passageways in said head and casing section open at one end to said control pipe and at the opposite end to said bore in a position with respect to said control piston to be opened to said pressure chamber upon movement of said brake cylinder piston from said normal position in excess of a chosen degree.

5. A brake cylinder device comprising a casing, a motor piston slidably mounted in said casing and movable in response to fluid pressure in a pressure chamber at one side of said piston, a conduit through which fluid under pressure may be supplied to said chamber, a measuring piston slidably mounted in said casing and subject on one side to fluid pressure in said pressure chamber, lever means operable by said measuring piston in response to pressure of fluid in said pressure chamber to follow the movement of said motor piston and thereby to prevent movement of said measuring piston responsively to the pressure of fluid in said pressure chamber except as limited by the position of said motor piston, a control conduit through which fluid under pressure may be delivered from said chamber, and valve means movable with said measuring piston and operable to connect said pressure chamber to said control conduit only after said motor piston moves responsively to the pressure in said chamber beyond a predetermined zone of travel.

6. A brake cylinder device comprising a cylindrical casing, a brake operating piston operable within said cylindrical casing, resilient means biasing said piston to a normal position adjacent one end of said casing and yieldingly opposing movement of said piston toward the opposite end of said casing responsively to the pressure of fluid supplied to a pressure chamber formed within said cylindrical casing at one side of said piston, a casing section detachably secured to said casing and providing a bore therein which opens into said pressure chamber, a piston valve operable within said bore and subject on one side to the pressure of fluid in said pressure chamber, a lever fulcrumed intermediate its ends within said pressure chamber, said lever being pivotally connected at one end to said piston valve and engaging the face of the said piston within said pressure chamber in abutting contact at its opposite end thereby to prevent movement of said piston valve in said bore responsively to the pressure of fluid supplied to the pressure chamber except as limited by the position of said piston, said casing section providing within said bore on the side opposite that exposed to the pressure of fluid in said pressure chamber a second chamber which is constantly open to amosphere, said casing section also having therein a control port and passage opening into said bore in such relation to said piston valve that said control port and passage opens into said second chamber so long as said piston operates within a certain travel zone out of said normal position and is disconnected from said second chamber and connected to said pressure chamber under the control of said piston valve only after said piston moves out of said certain travel zone away from said normal position.

References Cited in the file of this patent

UNITED STATES PATENTS

| Number | Name | Date |
|---|---|---|
| 396,858 | Carver | Jan. 29, 1889 |
| 726,155 | Fulton | Apr. 21, 1903 |
| 747,772 | Rickman | Dec. 22, 1903 |
| 772,842 | Spencer | Oct. 18, 1904 |
| 1,786,299 | Hancock | Dec. 23, 1930 |
| 2,387,271 | Kittler | Oct. 23, 1945 |
| 2,501,707 | Bent | Mar. 28, 1950 |
| 2,511,844 | Grove | June 20, 1950 |
| 2,529,431 | Steins | Nov. 7, 1950 |
| 2,537,273 | Kennedy | Jan. 9, 1951 |